US007010723B2

(12) United States Patent
Pelner

(10) Patent No.: US 7,010,723 B2
(45) Date of Patent: Mar. 7, 2006

(54) METHOD TO COUPLE INTEGRATED CIRCUIT PACKAGES TO BONDING PADS HAVING VIAS

(75) Inventor: Jenny M. Pelner, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 10/073,546

(22) Filed: Feb. 11, 2002

(65) Prior Publication Data

US 2003/0154428 A1    Aug. 14, 2003

(51) Int. Cl.
    *G06F 11/00* (2006.01)
(52) U.S. Cl. ............................................. 714/36; 713/2
(58) Field of Classification Search ................. 714/36; 713/2
    See application file for complete search history.

(56) References Cited

U.S. PATENT DOCUMENTS

| | | | | |
|---|---|---|---|---|
| 5,872,967 A | * | 2/1999 | DeRoo et al. ................ 713/2 |
| 5,978,913 A | * | 11/1999 | Broyles et al. ................ 713/2 |
| 5,987,625 A | * | 11/1999 | Wolff ........................... 714/36 |
| 6,014,744 A | * | 1/2000 | McKaughan et al. .......... 713/2 |
| 6,216,226 B1 | * | 4/2001 | Agha et al. .................... 713/2 |
| 6,640,316 B1 | * | 10/2003 | Martin et al. ................. 714/36 |
| 6,718,461 B1 | * | 4/2004 | Ewertz .......................... 713/1 |
| 6,721,885 B1 | * | 4/2004 | Freeman et al. ............... 713/2 |
| 6,732,299 B1 | * | 5/2004 | Mbarki ........................ 714/36 |
| 6,754,817 B1 | * | 6/2004 | Khatri et al. .................. 713/1 |
| 2002/0162052 A1 | * | 10/2002 | Lewis ......................... 714/36 |
| 2002/0184483 A1 | * | 12/2002 | Morrison et al. .............. 713/2 |

OTHER PUBLICATIONS

Microsoft; Simple Boot Flag Specification Overview; http//www.microsoft.com/whdc/resources/respec/specs/simp_bios.mspx; Updated Feb. 7, 2002. (Copy Enclosed).*

* cited by examiner

Primary Examiner—Robert Beausoliel
Assistant Examiner—Marc Duncan
(74) Attorney, Agent, or Firm—Schwegman, Lundberg, Woessner & Kluth, P.A.

(57) ABSTRACT

An improved method of testing a computer system comprises a sequence of tests that are performed when the computer system is first turned on, according to one embodiment. The operation of various components of the computer system, such as a chipset, a random access memory, a cache memory, a video controller, a keyboard controller, peripheral memory controllers, busses, and the like, is tested by a test program stored in read only memory (ROM). If the components successfully pass, an address is permanently changed in ROM, so that the test sequence is bypassed whenever the computer system is subsequently booted, saving significant time during future reboots. An improved computer system and a machine-accessible medium are also described.

27 Claims, 6 Drawing Sheets

METHOD TO COUPLE INTEGRATED CIRCUIT PACKAGES TO BONDING PADS HAVING VIAS

TECHNICAL FIELD

Embodiments of the present invention relate generally to the field of data processing and, more particularly, to a method of testing a computer system.

BACKGROUND INFORMATION

It is known in the prior art to test certain computer system components when the computer system is first started, prior to booting or loading the operating system. Testing can be performed, for example, by a basic input output system ("BIOS") that typically resides in a ROM.

The term "boot", and associated terms such as "booting" and "boot up", as used herein, mean the process by which a computing device such as a computer system loads an operating system or operating system kernel into an operational memory, such as random access memory ("RAM") from a long-term storage memory, such as a read-only memory (ROM) or a hard drive. The computer operating system performs various administrative tasks and is responsible for controlling the execution of other computer programs on the computer system.

The BIOS comprises a set of computer-executable routines that enable the computer system to perform a series of self-tests on various of its components to make sure everything is functioning properly. The BIOS also typically initializes various of these components, which can include, but are not limited to, system busses; cache memory; flash or non-volatile memory, e.g. complementary metal oxide semiconductor ("CMOS") memory; clock; keyboard controller; video display controller; printer controller; peripheral controller(s); mouse controller; communications port(s); and so forth. In addition to performing such startup tasks, the BIOS can also direct many basic operational functions of the computer system, such as controlling the keyboard, the video display, disk drives, communications functions, and other assorted components and functions.

The architectural organization of computer components can assume many forms. In a known architecture, various components can reside in a chipset coupled to a processor.

Because ROM memory is typically slower than RAM, the BIOS is usually first loaded from ROM into RAM, and it is then executed from RAM. Before loading the BIOS into RAM, it may test a memory controller located, for example, in the chipset. It may then test the RAM to be sure it is functioning properly, and it initializes the RAM. The RAM test typically involves successively writing a predetermined data pattern to each memory address, followed by successively reading each memory block and comparing its contents with the predetermined data pattern. This test can consume a significant amount of time, depending upon the size of the RAM. The BIOS may first test only the amount of RAM required to load the BIOS from ROM, and then check the remainder of RAM later following other tests.

The BIOS continues to execute tests on and to initialize various components, which may be located in the chipset, on the motherboard, or elsewhere in the computer system, e.g. mass storage devices. All of these tests consume significant time. It is not uncommon for a typical boot of a computer system to consume one to two minutes.

DETAILED DESCRIPTION OF EMBODIMENTS OF THE INVENTION

In the following detailed description of embodiments of the invention, reference is made to the accompanying drawings which form a part hereof, and in which are shown by way of illustration, but not of limitation, specific preferred embodiments of the invention. These embodiments are described in sufficient detail to enable those skilled in the art to understand and implement them, and it is to be understood that other embodiments may be utilized and that logical, procedural, mechanical, and electrical changes may be made without departing from the spirit and scope of the present disclosure. The following detailed description is, therefore, not to be taken in a limiting sense, and the scope of embodiments of the present invention is defined only by the appended claims.

An improved method of testing a computer system is described. A sequence of tests is performed when the computer system is first turned on. The operation of various components of the computer system, such as a chip set, a random access memory (RAM), a cache memory, a video controller, a keyboard controller, peripheral memory controllers, busses, and the like, is tested by a test program stored in read only memory (ROM). If the components successfully pass, an address is permanently changed in ROM, so that the test sequence is bypassed whenever the computer system is subsequently booted, saving significant time during future reboots. In one embodiment, a field test option enables system components to be subsequently retested, if desired. A computer system and a machine-accessible medium are also described.

Computer systems built in accordance with embodiments of the present invention can quickly boot, thus enhancing their commercial value.

Figure 1:
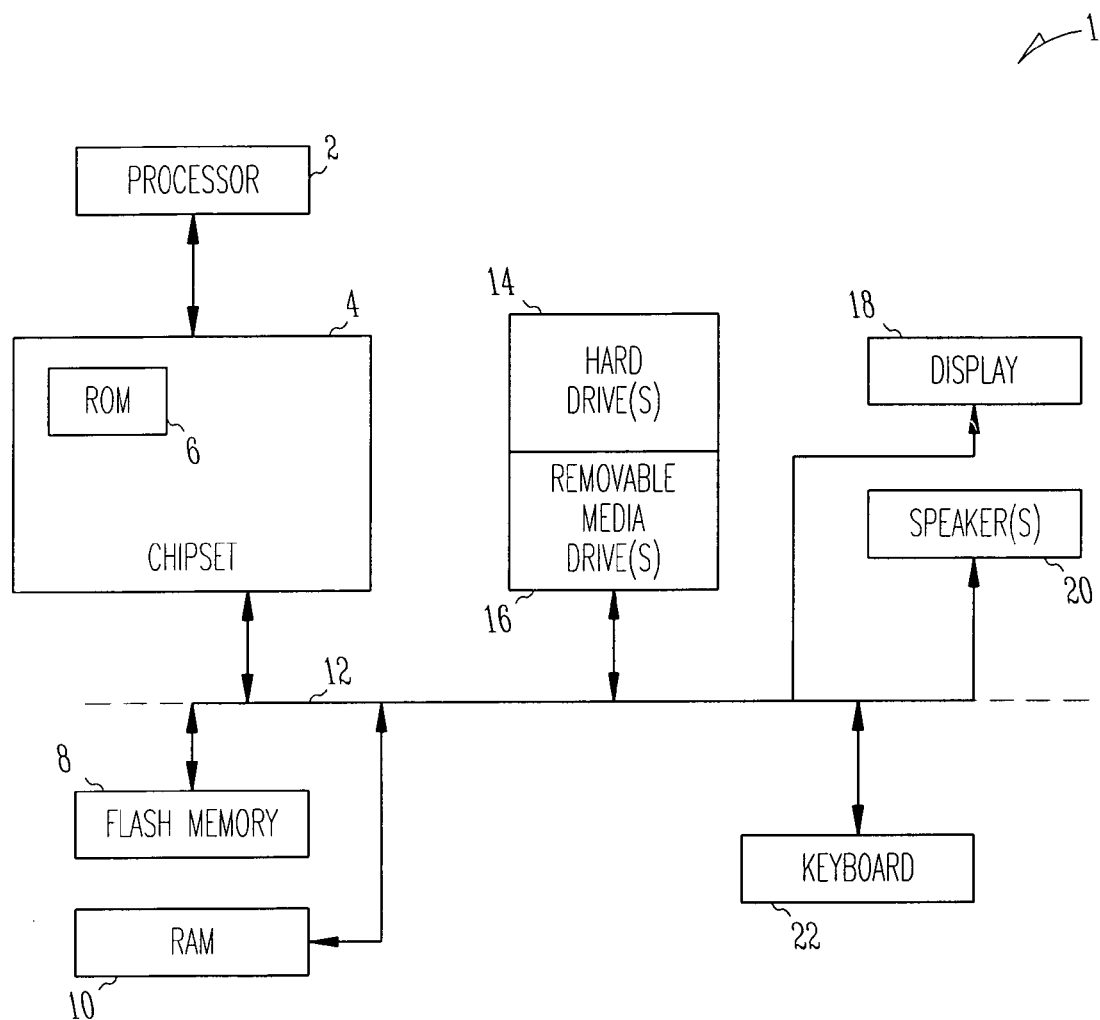
FIG. 1 illustrates a block diagram of a computer system to perform testing of the computer system's components, in accordance with one embodiment of the invention.

FIG. 1 illustrates a block diagram of a computer system 1 to perform testing of the computer system's components, in accordance with one embodiment of the invention.

FIG. 1 and the following discussion are intended to provide a brief, general description of a suitable computing environment in which certain embodiments of the invention may be implemented. An exemplary system includes a computational machine or computer system 1 having system bus 12. Typically, attached to bus 12 is a chipset 4, which can comprise one or more integrated circuits(IC's).

"Suitable", as used herein, means having characteristics that are sufficient to produce the desired result(s). Suitability for the intended purpose can be determined by one of ordinary skill in the art using only routine experimentation.

In the embodiment shown, chipset 4 comprises a ROM 6. Chipset 4 can also comprise additional functional elements (not shown), such as one or more memory controllers, bus controllers, peripheral controllers, power management controllers, general purpose input/output controllers, keyboard controllers, and the like. In one embodiment, an 82443MX chipset (available from Intel Corporation, Santa Clara, Calif., U.S.A.) is used.

A processor 2 is coupled to chipset 4. In one embodiment, a Celeron™ processor (available from Intel Corporation, Santa Clara, Calif., U.S.A.) is used.

The term "processor", as used herein, means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit. The term also includes embedded controllers, such as Generic or Programmable Logic Devices or Arrays, Application Specific Integrated Circuits, single-chip computers, and the like.

Also coupled to bus 12 are a flash memory 8 and a random access memory (RAM) 10. Computer system 1 can also include one or more hard drives 14 and one or more removable media drives 16 for handling compact disks (CDs), digital video disks (DVDs), diskettes, magnetic tape cartridges, memory sticks, and other types of data storage. Additional components can also be attached to bus 12 such as a display 18, one or more speakers 20, and a keyboard 22. Display 18 can be of any suitable type, such as a touch screen, cathode ray tube (CRT) display, liquid crystal display, plasma display, or the like. Keyboard 22 can comprise any suitable type of data entry element, such as touch screen, key pad, pointing device (e.g. a mouse, trackball, joy stick, touch pad, touch sensitive screen, etc.), or the like.

While the embodiment illustrated in FIG. 1 shows a consolidated bus 12 for ease of illustration, the computer system 1 illustrated in FIG. 1 could be implemented with multiple busses. For example, separate busses could be coupled between chipset 4 and other components shown in FIG. 1, such as flash memory 8, RAM 10, hard drive(s) 14, removable media drive(s) 16, display 18, and keyboard 22. Alternatively, one or more of such separate busses could be consolidated. The particular arrangement of busses among the system components is not critical and is a matter of design choice.

Embodiments of the invention may be implemented in conjunction with program modules, including functions, procedures, data structures, application programs, etc. for performing tasks, or defining abstract data types or low-level hardware contexts. Program modules may be stored in ROM 6, in flash memory 8, in RAM 10, on hard drive(s) 14, and/or on removable media drive(s) 16.

Computer system 1 can be of any type. For example, computer system 1 can be a single-processor or multi-processor machine, a portable computer, laptop computer, notebook computer, Internet appliance, handheld device (e.g., Personal Digital Assistants (PDAs)), a cellular telephone, a personal entertainment device (e.g. digital music player, digital video player, video game, electronic book, etc.), one-way or two-way radio, or the like.

Figure 2:
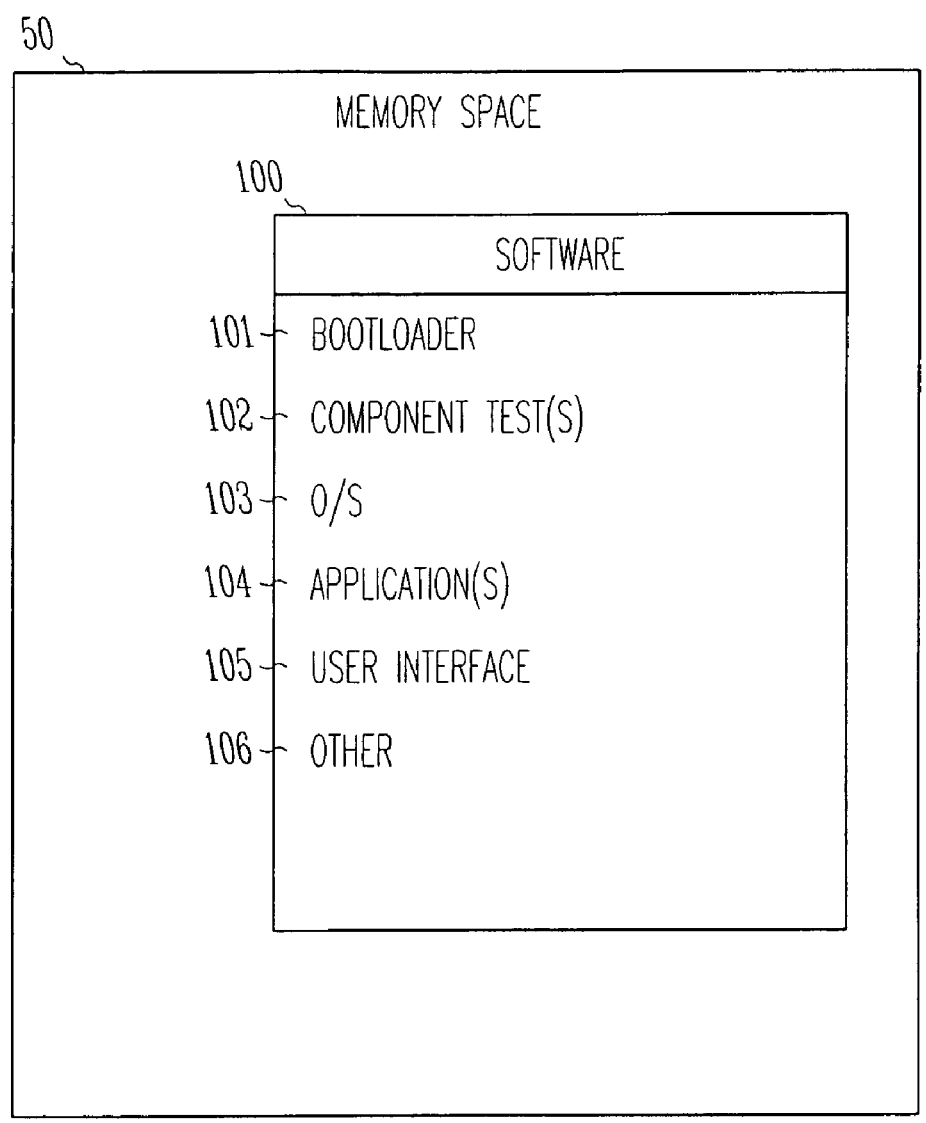
FIG. 2 illustrates a schematic representation of memory space in the computer system of FIG. 1, in accordance with one embodiment of the invention.

FIG. 2 illustrates a schematic representation of memory space 50 in the computer system 1 of FIG. 1, in accordance with one embodiment of the invention. Memory space 50 comprises software 100. Software 100 includes a bootloader 101, one or more component tests 102, an operating system (O/S) 103, and one or more applications 104. Software 100 can also comprise user interface software 105, and other software 106, such as communications software.

The one or more component tests 102 can be for any component in computer system 1. For example, component tests 102 can include tests to verify the proper operation of RAM 10, bus 12, hard drive(s) 14, removable media drive(s) 16, display 18, speaker(s) 20, and keyboard 22. Component tests 102 can also include tests for various components in chipset 4. These can include memory controllers, peripheral controllers, keyboard controller, and so forth, none of which are shown in FIG. 1, but which can be included in chipset 4 (FIG. 1)

Still referring to FIG. 2, component tests 102 can be for any component at any hierarchical, physical, logical, or packaging level within computer system 1. For example, the component can be located on a circuit board, mezzanine board, or daughter board. The component can be a peripheral device. The component need not be physically coupled to computer system 1. For example, the component could be coupled to computer system 1 via a radio frequency link such as a Bluetooth link.

In FIG. 2, the software 100 can reside in any suitable machine-accessible media, such as any type(s) of memory mentioned earlier regarding the description of FIG. 1. One of ordinary skill in the art is capable of writing suitable computer program instructions, for storage on suitable machine-accessible media, which when accessed by a processor or other computational machine result in the methods of testing a computer system being performed. Exemplary embodiments of such methods are described below with respect to FIG. 3 and then FIG. 4

Figure 3:
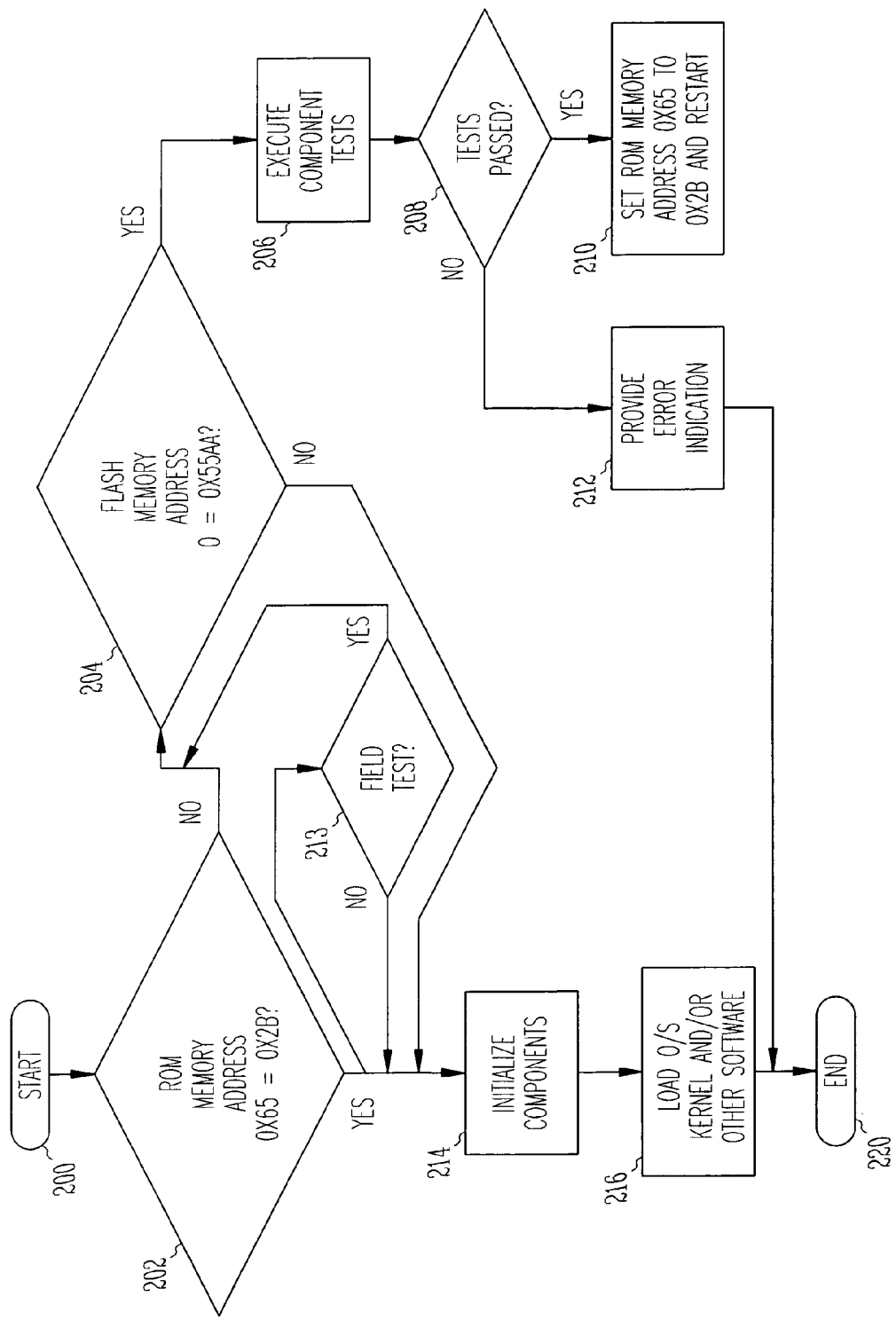
FIG. 3 illustrates a flow diagram of a method to test components of a computer system, which method is implemented in a computer system or in a computational machine operating under control of instructions residing on a machine-accessible medium, in accordance with various embodiments of the invention.

FIG. 3 illustrates a flow diagram of a method to test components of a computer system, which method is implemented in a computer system or in a computational machine operating under control of instructions residing on a machine-accessible medium, in accordance with various embodiments of the invention. The method begins at 200.

In 202, a determination is made whether a particular memory location contains a first predetermined value. The presence of the first predetermined value would indicate that the components have previously been tested. The absence of the first predetermined value would indicate that the components have not yet been tested.

In one embodiment, the particular memory location is address 0x65 in ROM 6 (FIG. 1), and the first predetermined value is 0x2b. ROM 6 is used because it is a persistent memory and because it is the most reliable type of memory within computer system 1. If memory location 0x65 of ROM contains the first predetermined value 0x2b, the method proceeds to 214 (still referring to FIG. 3). Otherwise, it proceeds to 204.

In 204, a determination is made whether another particular memory location contains a second predetermined value. The presence of the second predetermined value would indicate that one or more component tests are present, while the absence of the second predetermined value would indicate that no tests are present.

In one embodiment, the other particular memory location is address 0 in flash memory 8 (FIG. 1), and the second predetermined value is 0x55aa. Flash memory 8 is used because it is where the one or more tests are ordinarily stored. If memory location 0 of flash memory 8 (FIG. 1) contains the first predetermined value 0x55aa, the method proceeds to 206 (still referring to FIG. 3). Otherwise, it proceeds to 214.

In 206, the one or more component tests are executed. The details of such tests are not material to embodiments of the present invention. Those of ordinary skill are capable of developing suitable component tests to determine whether components are operating properly within their specifications.

In 208, a determination is made whether all tests have been passed. If so, the method proceeds to 210; otherwise, it proceeds to 212.

In 210, address 0x65 of ROM is set to 0x2b to indicate that the components of the computer system have been successfully tested. The computer system is then automatically restarted by returning to start block 200.

In 212, one or more error indications are provided to indicate details concerning the test failure(s). Such details can include the specific component(s) and the type(s) of failure. For example, the error indication could specify a failure in RAM, in a hard drive, in the display, or in any other system components.

In 214, the components of the computer system are initialized, and the method proceeds to 216. No component testing is performed in 214. All components requiring initialization are initialized. For example, RAM, cache, and various busses are typically initialized.

In 216, the operating system, operating system kernel, and/or other software are loaded. In one embodiment, the operating system or operating system kernel is loaded. However, in another embodiment, a different type of software could be loaded, such as application software, or communication software. The software to be loaded at 216 can be of any type.

In 213, a determination is made whether a field test is to be performed. A field test can be performed, in one embodiment, to enable system components to be tested subsequently to an initial successful test. Such option could be performed, for example, by the system user or by system repair personnel, and it could be initiated in any suitable manner, such as, for example, depressing a particular key while starting the system. Initiating a field test command during startup forces the method to go to 204, even though ROM memory address 0x65 contains 0x2b. If no field test command is present, the method goes to 214.

The method ends at 220.

It will be seen that once the one or more components of the computer system have been successfully tested, for example, during manufacture, such one or more components are not subsequently tested during startup, unless a field test is commanded. By bypassing component testing during startup, the computer system starts quickly. This can be particularly important for certain types of consumer products, such as but not limited to Internet appliances, cell phones, personal entertainment systems, and palm-top computers.

Figure 4A:
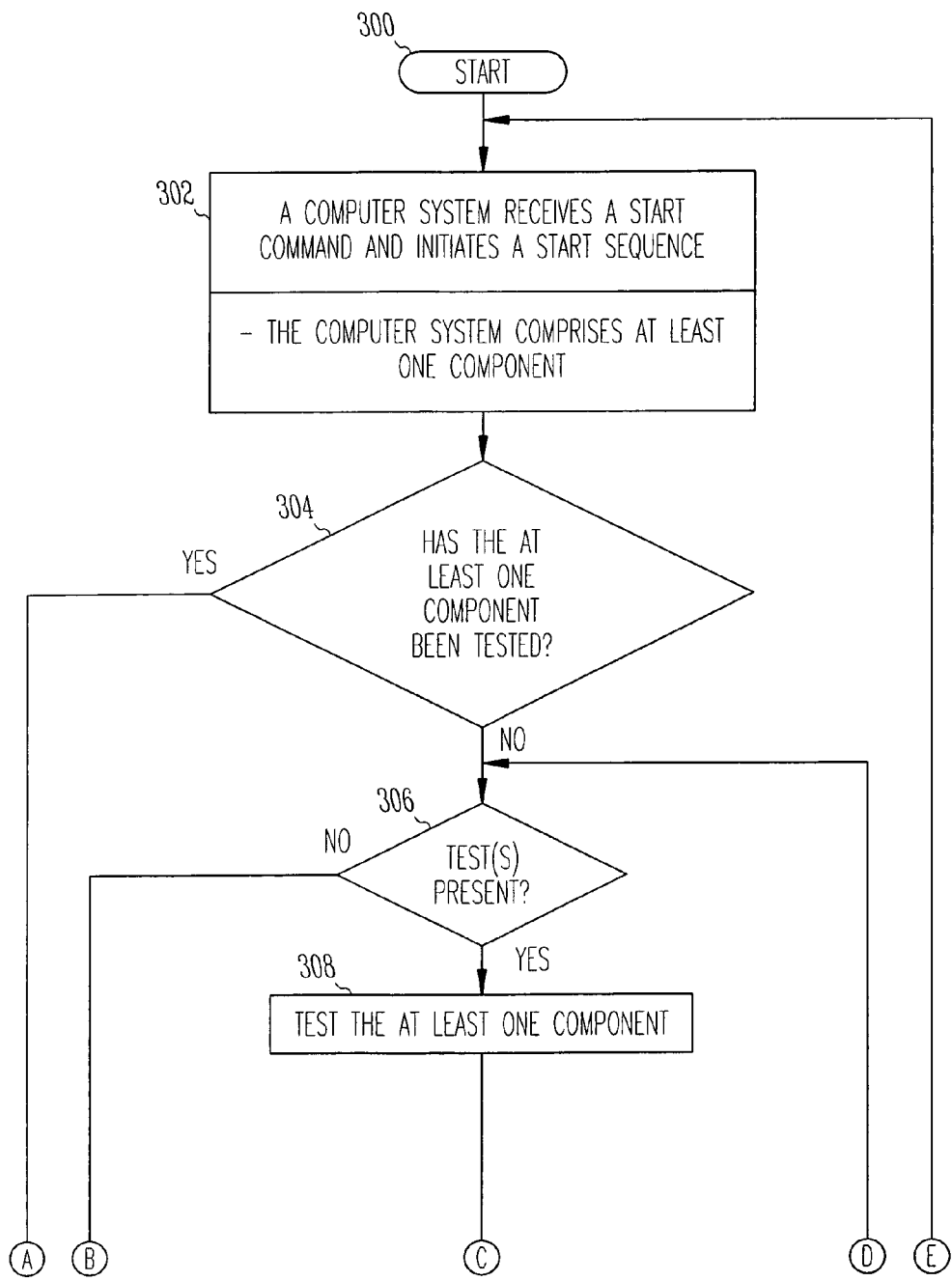
FIGS. 4A, 4B, and 4C together illustrate a flow diagram of a method to test at least one component of a computer system, which method is implemented in a computer system or in a computational machine operating under control of instructions residing on a machine-accessible medium, in accordance with various embodiments of the invention.
Figure 4B:
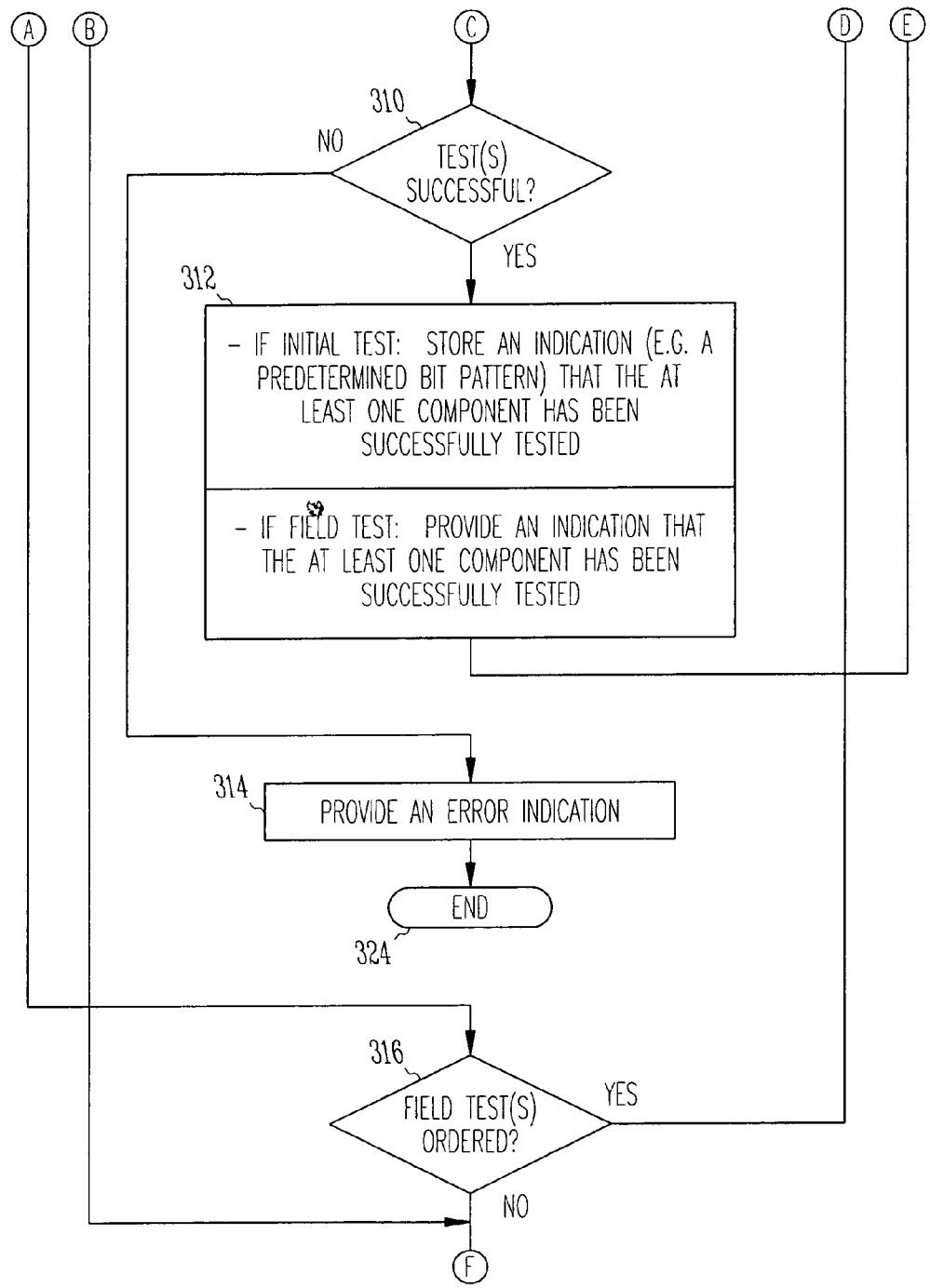
Figure 4C:
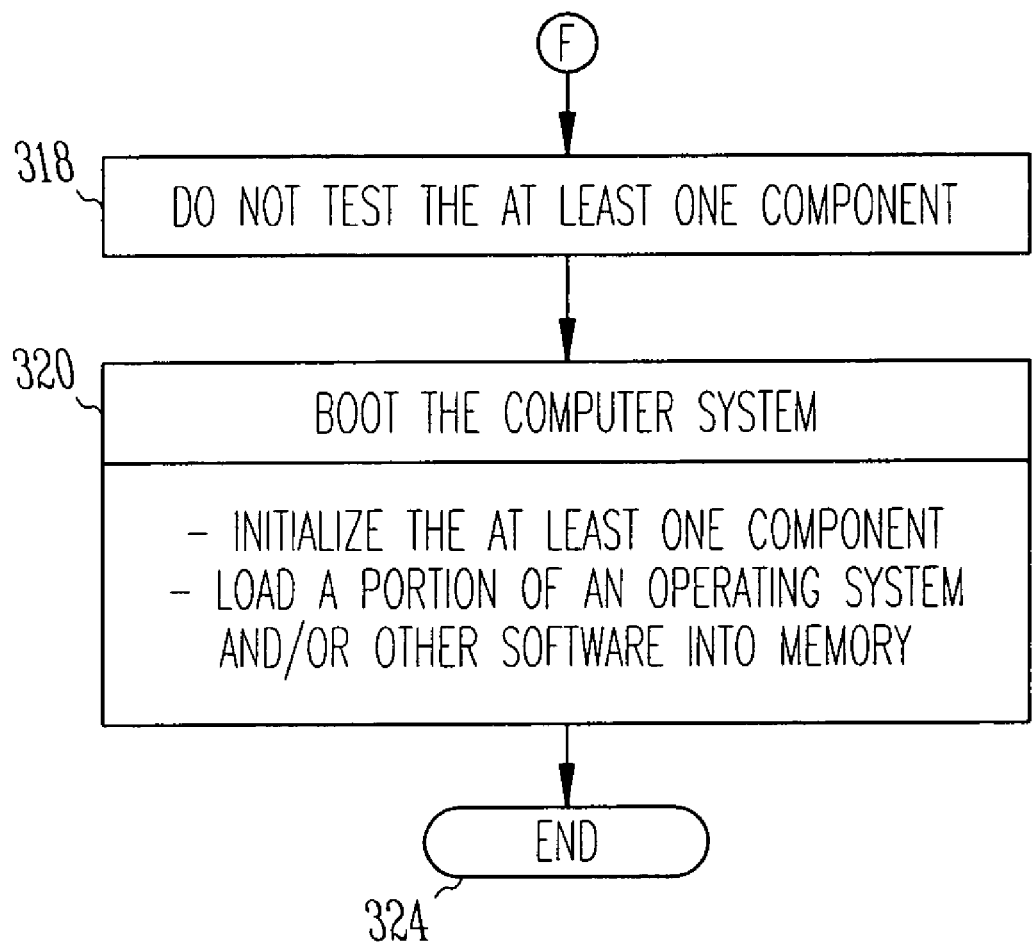

FIGS. 4A, 4B, and 4C together illustrate a flow diagram of a method to test at least one component of a computer system, which method is implemented in a computer system or in a computational machine operating under control of instructions residing on a machine-accessible medium, in accordance with various embodiments of the invention. The method starts at 300 in FIG. 4A.

In 302, a computer system receives a start command, and the computer system initiates a start sequence. The start sequence can be performed by a computer program module, such as but not limited to a bootloader. The computer system comprises at least one component.

In 304, a determination is made whether the at least one component has been tested. If so, the method goes to 316 (FIG. 4B); otherwise it goes to 306.

In 306, a determination is made whether one or more component tests are present. Such tests are typically stored within a memory within the computer system; however, they could be accessed from a remote system via communications link. If one or more component tests are available, the method proceeds to 308; otherwise it goes to 318 (FIG. 4C).

In 308, the at least one component is tested. If there is more than one component test, each component test is run for the corresponding system component. The method proceeds to 310 in FIG. 4B.

In 310, a determination is made whether the one or more tests were successful. If so, the method proceeds to 312; otherwise it goes to 314.

In 312, if this was the initial test of the one or more components, then an indication (e.g. a predetermined bit pattern) is stored to indicate that the at least one component has been successfully tested. The indication can be stored in a memory within the computer system, such as but not limited to ROM 6 (FIG. 1) or other memory element of computer system 1 (FIG. 1), or it can be stored externally, such as in a memory within a network to which the computing system is coupled.

Still with reference to FIG. 4B, if this was a field test (i.e. subsequent to a successful initial testing of the at least one components of the computer system), then an indication is provided that the at least one component has been successfully tested. Such indication can be of any type, such as but not limited to turning on a light-emitting diode (LED), logging the successful test in a file, and so forth. Alternatively, an indication can be eliminated for a successful field test, and a subsequent successful startup operation can constitute sufficient indication that the field test was successful.

In 314, an error indication is provided. Such error indication can be of any type. For example, an LED could be turned on in a bank of LED's to indicate which component(s) failed. Information regarding the failed test(s) could be stored in a file, on or off the computer system being tested, e.g. in a computer system coupled to the computer system under test. From 314, the method goes to 324, where the method ends.

In 316, a determination is made whether field testing has been ordered. If so, the method goes back to 306 in FIG. 4A; otherwise, it goes to 318 in FIG. 4C. Field testing can be ordered by a special command during startup, e.g. by holding down a key during startup. Ordinarily, field testing would not be commanded during a typical startup. However, field testing could optionally be ordered by a user of the computer system or by repair personnel, subsequent to initial successful testing of the at least one component of the computer system.

In 318 (FIG. 4C), the at least one component of the computer system is not tested, and the method proceeds directly to 320.

In 320, the computer system is booted. In one embodiment, booting comprises initializing one or more components of the computer system. It typically also comprises loading an operating system or portion thereof. In addition, or alternatively, other software can be loaded into memory, such as application software, communication software, or the like.

The method ends at 324.

The methods illustrated in FIGS. 3, 4A, 4B, and 4C are merely examples, and many other implementations are also possible, as will be apparent to those of ordinary skill in the art.

For example, in the method described in FIG. 3, storing the first predetermined value could be deferred until the computer system had successfully started a certain number of times. That is, the first predetermined value would not be stored until the computer system successfully passed its one or more component tests N times. After passing the component tests N times, the risk of premature failure could be assumed to be minimal.

It should be understood that the operations shown in FIGS. 3, 4A, 4B, and 4C are merely representative and not exclusive, and that many other different alternative operations could be implemented using the concepts taught by the present disclosure.

The operations described above with respect to the methods illustrated in FIGS. 3, 4A, 4B, and 4C can be performed in a different order from those described herein. Also, it will be understood that although the methods are described as having an "end", they could be continuously performed.

Implementing a component test method, as described herein, is carried out by suitable instructions in one or more computer programs that are stored in and executed by the computer system shown in FIG. 1. One of ordinary skill in the art is capable of writing suitable instructions to implement the objectives and features of the embodiments of the invention as described herein.

CONCLUSION

Embodiments of the present invention provide a computer system and a machine-executed method for quickly booting. Various embodiments have been illustrated and described herein.

According to one embodiment, a sequence of tests is performed when the computer system is first turned on. The operation of various components of the computer system, such as a chipset, a RAM, a cache memory, a video controller, a keyboard controller, peripheral memory controllers, busses, and the like, are tested by a test program in a ROM. If the components successfully pass, an address is permanently changed in ROM, so that the test sequence is bypassed whenever the computer system is subsequently booted, saving significant time during future reboots. In one embodiment, a field test option allows the computer system components to be tested subsequent to the initial test sequence. An improved computer system and a machine-accessible medium are also described.

Computer systems built in accordance with the present disclosure can quickly boot, thus enhancing their commercial value.

Other embodiments will be readily apparent to those of ordinary skill in the art. The elements, architecture, and sequence of operations can all be varied to suit particular computer system requirements.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

Having described and illustrated several embodiments of the invention, it will be recognized that the illustrated embodiments can be modified in arrangement and detail without departing from the concepts disclosed. And, although the foregoing discussion has focused on particular embodiments, other configurations are contemplated. In particular, even though expressions such as "in one embodiment", "in another embodiment", or the like are used herein, these phrases are meant to generally reference embodiment possibilities, and they are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and it should not be taken as limiting the scope of embodiments of the invention.

Although specific embodiments have been illustrated and described herein, it will be appreciated by those of ordinary skill in the art that any arrangement or process that is calculated to achieve the same purpose may be substituted for the specific embodiments shown. This application is intended to cover any adaptations or variations of embodiments of the present invention. Therefore, it is manifestly intended that embodiments of this invention be limited only by the claims and the equivalents thereof.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. A method comprising:
   starting a computer system comprising at least one component;
   determining whether the at least one component has previously been successfully tested;
   if not, testing the at least one component, and
   otherwise, not testing the at least one component, wherein if the at least one component is successfully tested, permanently storing an indication that the at least one component has been successfully tested; and
   wherein storing the indication is deferred until the computer system has successfully been started a predetermined number of times.

2. The method recited in claim 1, wherein the indication comprises a predetermined bit pattern.

3. The method recited in claim 2 wherein determining further comprises checking for the predetermined bit pattern.

4. The method recited in claim 3 and further comprising, if such predetermined bit pattern is present:
   booting the computer system.

5. The method recited in claim 3 and further comprising, if such predetermined bit pattern is present:
   determining whether a field test is ordered, and
   if so, testing the at least one component, and
   otherwise, booting the computer system.

6. The method recited in claim 5 and further comprising, after testing:
   determining whether the test was successful; and
   if so, providing an indication that the at least one component has been tested, and
   otherwise, providing an error indication.

7. The method recited in claim 1 and further comprising after storing:
   restarting the computer system.

8. The method recited in claim 1 and further comprising, if the at least one component is tested:
   determining whether the test was successful, and
   if so, storing an indication that the at least one component has been tested, and otherwise, providing an error indication.

9. The method recited in claim 1 and further comprising, if the at least one component is not tested:
   booting the computer system.

10. The method recited in claim 9, wherein booting comprises: initializing the at least one component; and
   loading a portion of an operating system into memory.

11. The method recited in claim 1 wherein determining further comprises checking for the presence of a test to test the at least one component.

12. The method recited in claim 11 and further comprising, if such a test is not present:
   booting the computer system.

13. The method recited in claim 11 wherein checking comprises checking for the presence of a predetermined bit pattern.

14. A computing device having at least one component and executing a computer program comprising the operations of:
   upon receiving a command to start the computing device, determining whether the at least one component has previously been successfully tested; and
   if not, testing the at least one component, and
   otherwise, not testing the at least one component, wherein
      if the at least one component is successfully tested, permanently storing an indication that the at least one component has been successfully tested; and
   wherein storing the indication is deferred until the computing device has successfully been started a predetermined number of times.

15. The computing device recited in claim 14 wherein the computer program further comprises the operation of:
   after storing, restarting the computing device.

16. The computing device recited in claim 14 wherein the computer program further comprises the operation of:
   if the at least one component is tested, determining whether the test was successful; and
   if so, storing an indication that the at least one component has been tested, and
   otherwise, providing an error indication.

17. The computing device recited in claim 14 wherein the computer program further comprises the operation of:
   if the at least one component is not tested, booting the computing device.

18. The computing device recited in claim 17 wherein, in booting, the at least one component is initialized, and a portion of an operating system is loaded into memory.

19. The computing device recited in claim 14 wherein, in determining, a check is made for the presence of a test to test the at least one component.

20. The computing device recited in claim 19 wherein the computer program further comprises the operation of:
   if such a test is not present, booting the computing device.

21. The computing device recited in claim 19 wherein, in checking, a check is made for the presence of a predetermined bit pattern.

22. An article comprising a computational machine-accessible medium having associated instructions, wherein the instructions, when accessed, result in a computational machine comprising at least one component performing:
   upon receiving a command to start the machine, determining whether the at least one component has previously been successfully tested;
   if not, testing the at least one component, and
   otherwise, not testing the at least one component, wherein
      if the at least one component is successfully tested, permanently storing an indication that the at least one component has been successfully tested; and
   wherein storing the indication is deferred until the machine has successfully been started a predetermined number of times.

23. The article of claim 22 wherein the instructions, when accessed, additionally result in the machine performing:
   after storing, restarting the machine.

24. The article of claim 22 wherein the instructions, when accessed, additionally result in the machine performing:
   if the at least one component is tested, determining whether the test was successful; and
   if so, storing an indication that the at least one component has been tested, and
   otherwise, providing an error indication.

25. The article of claim 22 wherein the instructions, when accessed, additionally result in the machine performing:
   if the at least one component is not tested, booting the machine.

26. The article of claim 25 wherein the instructions, when accessed, additionally result in the machine performing:
   in booting, the at least one component is initialized, and a portion of an operating system is loaded into memory.

27. The article of claim 22 wherein the instructions, when accessed, additionally result in the machine performing:
   in determining, a check is made for the presence of a test to test the at least one component and, if such a test is not present, booting the machine.

* * * * *

UNITED STATES PATENT AND TRADEMARK OFFICE
CERTIFICATE OF CORRECTION

PATENT NO. : 7,010,723 B2
DATED : March 7, 2006
INVENTOR(S) : Pelner

It is certified that error appears in the above-identified patent and that said Letters Patent is hereby corrected as shown below:

<u>Title page, Item [54] and Column 1, lines 1-3,</u>
Title, delete "METHOD TO COUPLE INTEGRATED CIRCUIT PACKAGES TO BONDING PADS HAVING VIAS" and insert -- METHODS AND APPARATUS TO TEST COMPUTER SYSTEM COMPONENTS --.

Signed and Sealed this

Thirteenth Day of June, 2006

JON W. DUDAS
*Director of the United States Patent and Trademark Office*